US006678020B2

(12) United States Patent
Ok et al.

(10) Patent No.: US 6,678,020 B2
(45) Date of Patent: Jan. 13, 2004

(54) DC TYPE PLASMA DISPLAY PANEL FOR BACK LIGHT OF LIQUID CRYSTAL DISPLAY DEVICE

(75) Inventors: Do Young Ok, Kyoungki-do (KR); Jun Ho Lee, Seoul (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 74 days.

(21) Appl. No.: 10/039,406

(22) Filed: Nov. 7, 2001

(65) Prior Publication Data

US 2002/0097348 A1 Jul. 25, 2002

(30) Foreign Application Priority Data

Nov. 22, 2000 (KR) ........................................ 2000-69667
Nov. 22, 2000 (KR) ........................................ 2000-69668

(51) Int. Cl.$^7$ ......................... G02F 1/1335; H01J 17/49
(52) U.S. Cl. ............................ 349/61; 349/62; 349/69; 349/70; 349/71; 313/582; 313/583
(58) Field of Search ............................. 349/22, 24, 32, 349/61, 62, 63, 64, 65, 69, 70, 71; 313/582, 583, 584, 586, 587, 484, 485, 486, 496

(56) References Cited

U.S. PATENT DOCUMENTS 6,406,346 B1 * 6/2002 Spindt et al. ................. 445/24
2003/0020843 A1 * 1/2003 Onishi et al. ................. 349/32

FOREIGN PATENT DOCUMENTS

| | | |
|---|---|---|
| JP | 03-263735 | * 11/1991 |
| JP | 5206158 | 8/1993 |
| JP | 7276046 | 10/1995 |
| JP | 10116448 | 5/1998 |

OTHER PUBLICATIONS

English abstract of JP 10–116448A2.
English abstract of JP 07–276046A2.
English abstract of JP 05–206158A2.

* cited by examiner

*Primary Examiner*—Minh Loan Tran
*Assistant Examiner*—Tan Tran
(74) *Attorney, Agent, or Firm*—Ladas & Parry

(57) ABSTRACT

Discloses is a DC type plasma display panel for back light of liquid crystal display device. The disclosed DC type plasma display for back light comprises a rear substrate functioning as a cathode electrode; an anode electrode plate arranged over the rear substrate with a predetermined distance and having a plurality of holes therein; a seal frame sealing the rear substrate and the anode electrode plate by inserting between the rear substrate and the anode electrode plate; a front substrate arranged over the anode electrode plate with a predetermined distance and having a fluorescent layer formed on the down side thereof; a plurality of spacers interposed between the anode electrode plate and the front substrate; a seal paste sealing the edges of the anode electrode plate and the front substrate; and a discharge gas filled in the space between the rear substrate and the front substrate.

10 Claims, 5 Drawing Sheets

DC TYPE PLASMA DISPLAY PANEL FOR BACK LIGHT OF LIQUID CRYSTAL DISPLAY DEVICE

BACKGROUND OF THE INVENTION

1. Field of the Invention

The present invention relates to a liquid crystal display device, and more particularly, to a DC type plasma display panel for back light capable of realizing high brightness and being free from pollution due to mercury (Hg).

2. Description of the Related Art

A liquid crystal display device has been substituted for a Cathode-ray tube (CRT) in a terminal of information system and video unit since it has advantages of light weight, thin thickness and low power consumption compared with the CRT. Recently, the liquid crystal display device has realized wide viewing angle and is prevented a color shift, thereby obtaining high quality screen. Therefore, it is widely used in a notebook PC and a computer monitor market. In addition, it is used in TV.

The liquid crystal display device cannot emit light by oneself differently from the CRT, so that back light unit is additionally included therein as a light source. The back light unit comprises a lamp as a practical light source, a light guide plate and a plurality of optical sheets, wherein the lamp is generally a fluorescent lamp.

However, there are limitations in employing the fluorescent lamp using mercury (Hg) due to pollution problem. Moreover, it is required that the light guide plate have a predetermined thickness in order to improve uniformity and brightness of light from the fluorescent lamp, so that the light guide plate functions as a cause increasing the thickness of liquid crystal display device. As a result, it is difficult to use the conventional back light unit having the above structure as the light source in the future.

Therefore, it has been proposed a technique that plasma display panel is used as a light source in order to prevent pollution due to Hg and to decrease the thickness of liquid crystal display device.

The plasma display panel is a kind of display devices in the same way as the liquid crystal display. The plasma display panel is used gas discharge in order to display a picture, thereby being free form the pollution due to Hg. The plasma display panel generally has a complicated structure, but, as shown in FIGS. 1 to 3, the plasma display panel for back light has a thin structure that a rear substrate 2 and a front substrate 4 comprising a pair of discharge electrodes 3*a*, 3*b*, 3*c* are sealed by seal paste 5 with discharge gas (not shown) filled therein. Therefore, it can be advantageously applied to realize thin thickness of liquid crystal display device. In the drawings, the FIG. 1 shows an opposite discharge type plasma display panel and FIGS. 2 and 3 show surface discharge type plasma display panels.

However, the conventional plasma display panel for back light has a disadvantage of low brightness since gas discharge is not sufficiently generated in a discharge space, so that it is difficult to realize high quality screen in the liquid crystal display device having the plasma display panel for back light.

Moreover, the conventional plasma display panel for back light has a disadvantage of high cost since it is generally manufactured in AC type and through printing, drying, firing and exposing processes, so that it is difficult to employ substitute for lamp as a light source.

SUMMARY OF THE INVENTION

Therefore, an object of the present invention is to provide DC type plasma display panel for back light capable of obtaining high brightness.

And, another object of the present invention is to provide DC type plasma display panel for back light capable of reducing the production cost.

In order to accomplish the above object, Dc type plasma display panel according to the present invention comprises: a rear substrate functioning as a cathode electrode, having a first groove formed at the edge of the upper side and a first oxide layer formed to surround the edge of the upper side including the first groove and all over the down side thereof; an anode electrode plate arranged over the rear substrate with a predetermined distance, having a second groove formed at the edge of the down side corresponding to the first groove of the rear substrate and a second oxide layer formed, to surround the edge of the down side including the second groove and the edge of the upper side, having a plurality of holes therein; a seal frame sealing the rear substrate and the anode electrode plate, wherein the down side of the seal frame is put in the first groove of the rear substrate and the upper side of the seal frame is put in the second groove of the anode electrode plate, and a third oxide layer is formed on the outer side of the seal frame; a front substrate arranged over the anode electrode plate with a predetermined distance, having a fluorescent layer formed on the upper side thereof opposite to the anode electrode plate; a plurality of spacers interposed between the anode electrode plate and the front substrate; seal paste sealing the edges of the anode electrode plate and the front substrate; and discharge gas filled in the space between the rear substrate and the anode electrode plate and between the anode electrode plate and the front substrate.

The first and the second oxide layers are formed to the region adjacent to the seal frame from the inner side thereof and the holes are formed at the region of the anode electrode plate unformed the second oxide layer in the inner side of the seal frame.

The first and the second oxide layers are formed to the region separated with a predetermined distance from the seal frame in the inner side thereof and the holes are formed at the region adjacent to the second groove of the anode electrode plate formed the second oxide layer in the inner side of the seal frame.

The above objects, and other features and advantages of the present invention will become more apparent after reading the following detailed description when taken in conjunction with the drawings.

DETAILED DESCRIPTION OF THE INVENTION

FIGS. 4 to 7 are a cross sectional views for showing a rear substrate, an anode electrode plate, a seal frame and a front substrate of DC type plasma display panel for back light according to the present invention.

Figure 1:
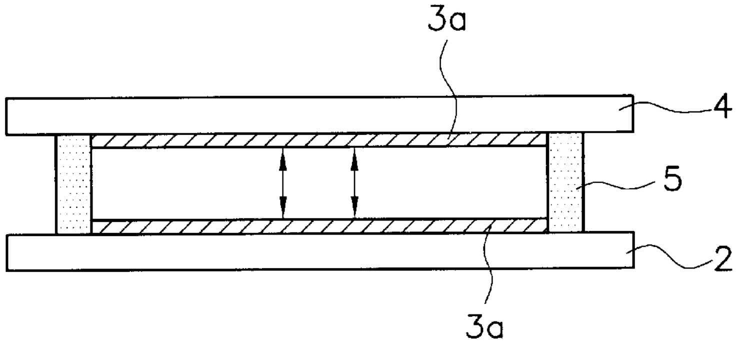
FIG. 1 (PRIOR ART)
FIGS. 1 to 3 are a cross sectional views for showing conventional plasma display panel for back light.
Figure 2:
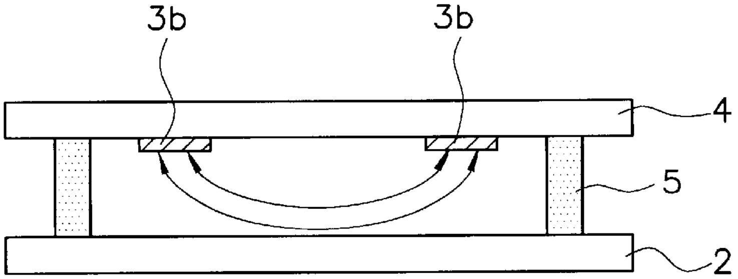
FIG. 2 (PRIOR ART)
Figure 3:
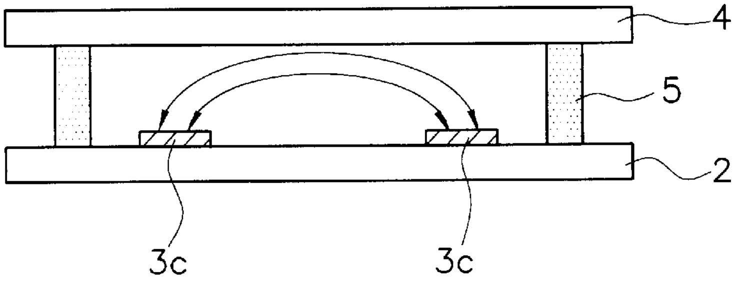
FIG. 3 (PRIOR ART)
Figure 4:
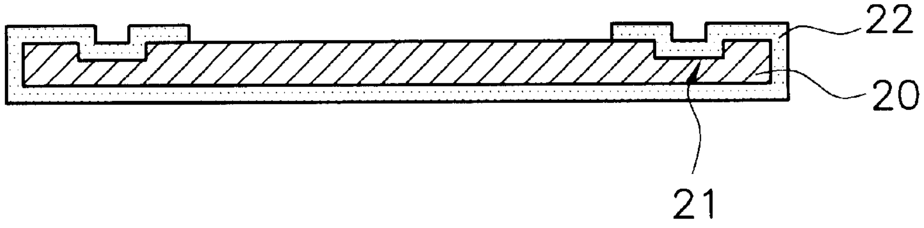
FIG. 4 is a cross sectional view for showing a rear substrate of DC type plasma display panel for back light according to the present invention.

Referring to FIG. 4, the rear substrate 20 is desirably made of aluminum plate, employed as a cathode electrode. A first groove 21 is formed to have a predetermined width and depth at the edge of the upper side of the rear substrate 20 by etching processes. A first oxide layer 22 is formed to surround the edge of the upper side including the first groove 21 and all over the down side of the rear substrate 20 by selectively oxidizing the surface of the rear substrate 20 using anodizing technique.

Figure 5:
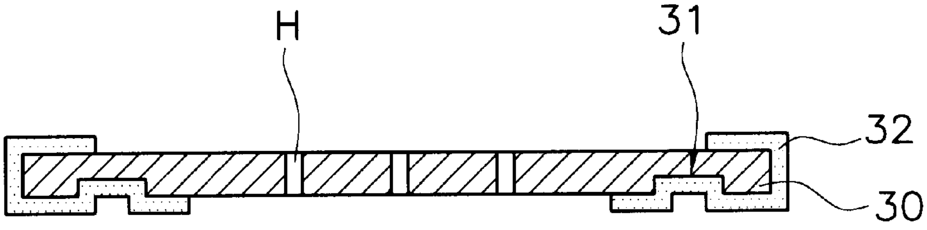
FIG. 5 is a cross sectional view for showing an anode electrode plate of DC type plasma display panel for back light according to the present invention.

Referring to FIG. 5, the anode electrode plate 30 is also made of aluminum plate. A second groove 31 is formed to have the same width and depth as that of the first groove 21 in the edge of the down side of the anode electrode plate 30 corresponding to the first groove 21 of the rear substrate 20. A second oxide layer 32 is formed to surround the edge of the down side including the second groove 31 and the edge of the upper side of the anode electrode plate 30 by selectively oxidizing the surface of the anode electrode plate 30. A plurality of holes H is formed by punching processes using drill on the portion of the anode electrode plate 30 whereon the second oxide layer 32 is not formed. The plurality of holes H is to form in order to provide gas flow path and is desirably formed on a suitable position and number.

Figure 6:
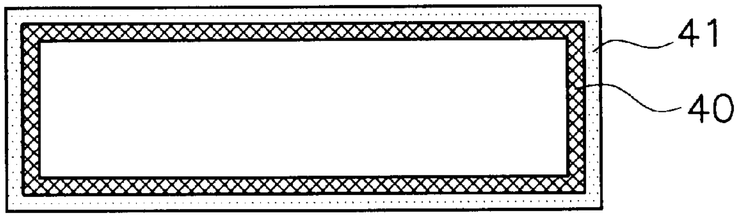
FIG. 6 is a plane view for showing a seal frame of DC type plasma display panel for back light according to the present invention.

Referring to FIG. 6, a seal frame 40 is provided to seal the rear substrate 20 and the anode electrode plate 30. The seal frame 40 is desirably made of aluminum and a third oxide layer 41 is formed on the outer surface thereof by anodizing technique to electrically insulate the rear substrate 20 and the anode electrode plate 30. The seal frame 40 has the same width as that of the first groove 21 except the first oxide layer 22 formed on the surface thereof or that of the second groove 31 except the second oxide layer 32 formed on the surface thereof.

Figure 7:
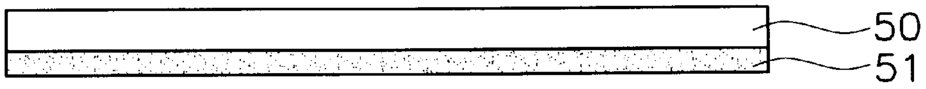
FIG. 7 is a cross sectional view for showing a front substrate of DC type plasma display panel for back light according to the present invention.

Referring to FIG. 7, a front substrate 50 is desirably made of glass substrate in order to transmit light and a fluorescent layer 51, for example, white luminous fluorescent layer is coated on the down side of the front substrate 50 opposite to the anode electrode plate 30 by printing process.

Figure 8:
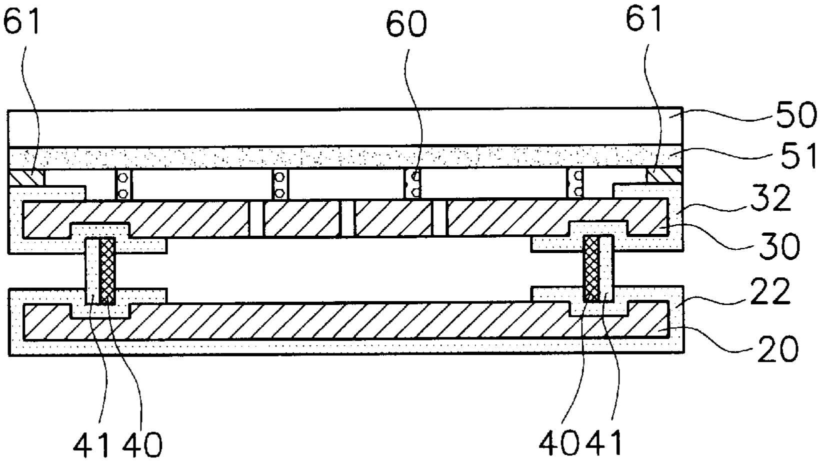
FIGS. 8 and 9 are a cross sectional view and a perspective view for showing DC type plasma display panel for back light according to the present invention.
Figure 9:
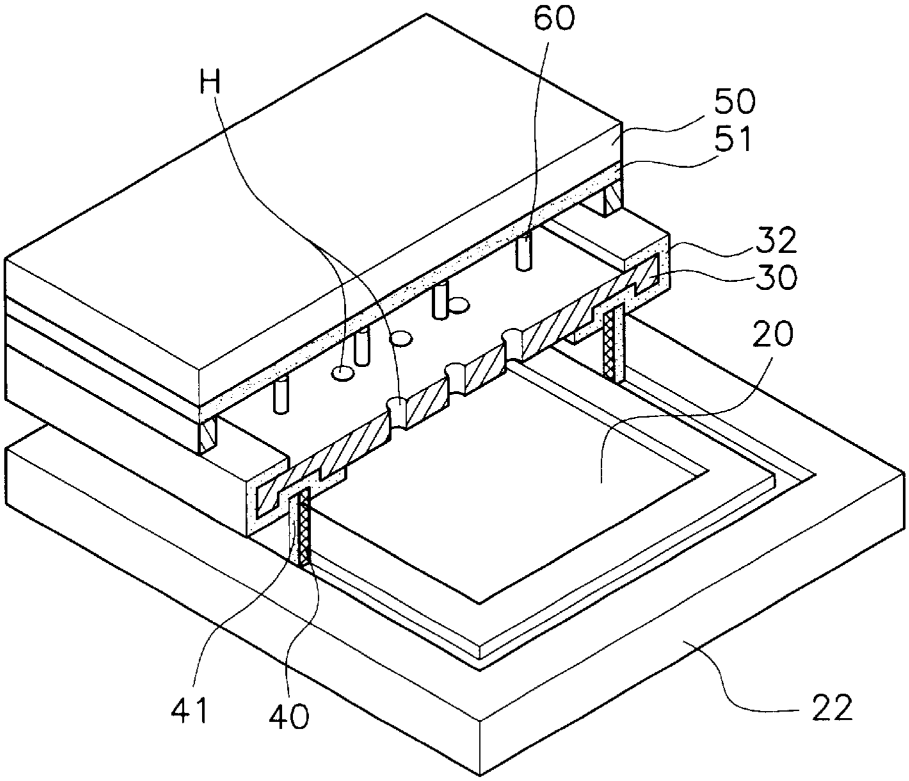

FIGS. 8 and 9 are a cross sectional view and a perspective view for showing the DC type plasma display panel for back light having the above-mentioned rear substrate, anode electrode plate, seal frame and front substrate according to the present invention.

As illustrated in the drawings, the anode electrode plate 30 is arranged on the rear substrate 20 with the seal frame 40 interposed. The down side of the seal frame 40 is put in the first groove 21 of the rear substrate 20 and the upper side thereof is put in the second groove 31 of the anode electrode plate 30, thereby sealing the rear substrate 20 and the anode electrode plate 30. The front substrate 50 is arranged on the anode electrode plate 30 with a spacer interposed. The edges of the front substrate 50 and the anode electrode plate 30 are sealed with seal paste 61. Discharge gas (not shown) is filled in the space between the rear substrate 20 and the anode electrode 30 sealed by the seal frame 40 and the seal paste 61 between the anode electrode plate 30 and the front substrate 50 sealed by the seal frame 40.

According to DC type plasma display panel for back light of the present invention having the above structure, since the anode electrode plate having a plurality of holes is arranged between the rear substrate and the front substrate, gas discharge is generated on the down side and upper side of the anode electrode plate, thereby obtaining high brightness.

That is, gas discharge is generally generated by electric field between cathode electrode and anode electrode, and particularly, actively generated around the cathode electrode. In the DC type plasma display panel for back light according to the present invention, gas discharge is generated in the discharge space of the lower part side of the anode electrode plate by electric field between the upper side of the rear substrate and the down side of the anode electrode plate. And, electric fields are also formed between the upper side of the rear substrate and the upper side of the anode electrode plate, thereby additionally generating gas discharge on the upper part of the anode electrode plate. This is because the anode electrode plate has a plurality of holes therein.

Therefore, the DC type the plasma display panel for back light of the prevent invention have high brightness since gas discharge is sufficiently generated on the region adjacent to the rear substrate functioning as the cathode electrode as well as the region adjacent to the front substrate separated from the cathode electrode.

As a result, the DC type plasma display panel for back light according to the present invention can be substituted for conventional lamp, thereby being free from pollution due to Hg. And, high brightness can be obtained in the present invention, thereby realizing high quality screen of liquid crystal display device. Moreover, the present invention can be advantageously employed to reduce the production cost since it is not required to perform printing, drying, firing and etching processes in order to form the discharge electrode, that is, cathode electrode and anode electrode.

Figure 10:
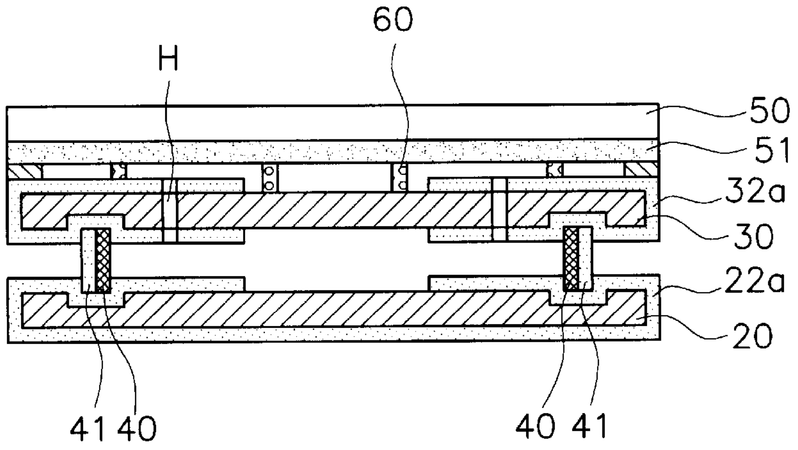
FIGS. 10 and 11 are a cross sectional view and a perspective view for showing DC type plasma display panel for back light according to another embodiment of the present invention.
Figure 11:
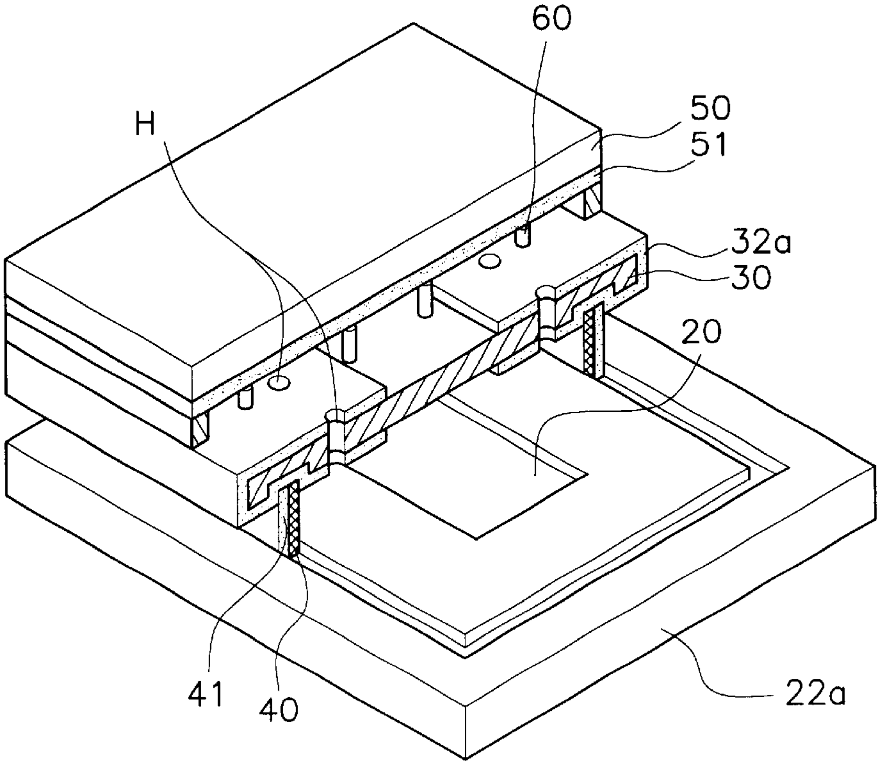

FIGS. 10 and 11 are a cross sectional view and a perspective view for showing DC type plasma display panel for back light according to another embodiment of the present invention.

Referring to FIGS. 10 and 11, another embodiment has several differences with the above embodiment in the rear substrate 20 and the anode electrode plate 30.

In the rear substrate 20, a first oxide layer 22*a* is formed to the region separated more from the first groove 21 to the center thereof. The first oxide layer 22*a* is formed to expose the center of the upper side of the rear substrate 20 in a box type.

In the anode electrode plate 30, a second oxide layer 32*a* is formed to the region separated more from the second groove 31 to the center thereof, similarly to the first oxide layer 22*a* of the rear substrate 20. The second oxide layer 32*a* is formed to expose the center of upper and down sides of the anode electrode plate 30 in a box type. And, differently from the above embodiment, a plurality of holes H for providing gas flow path are formed on the region of the anode electrode plate formed the second oxide layer 32, adjacent to the second groove 32*a*.

Another embodiment of the present invention generally has the same structure as that of the above embodiment. That is, the anode electrode plate 30 is arranged on the rear substrate 20 with the seal frame 40 interposed and the front substrate 50 on the anode electrode plate 30 with the spacer 60 interposed. The rear substrate 20 and the anode electrode plate 30 is sealed by the seal frame 40 and the anode electrode plate 30 and the front substrate 50 is sealed by seal paste 61. Discharge gas (not shown) is filled in the lower discharge space between the rear substrate 20 and the anode electrode plate 30 and in the upper discharge space between the anode electrode plate 30 and the front substrate 50. Herein, the lower discharge space defined by the rear substrate 20 and the anode electrode plate 30 has a box type.

According to the another embodiment, gas discharge is generated firstly in the lower discharge space due to electric field between the upper side of the rear substrate and the down side of the anode electrode plate and then secondly in the upper discharge space due to electric field between the upper side of the rear substrate and the upper side of the anode electrode plate. The second gas discharge is generated by a plurality of holes in the anode electrode plate.

The second discharge is generated in positive column discharge due to the long distance between the upper side of the rear substrate unformed the first oxide layer and the upper side of the anode electrode plate unformed the second oxide layer. On the other hand, the first discharge in the lower discharge space is employed as a firming source for lowering the starting voltage of the positive column discharge and maximizing UV generation. As a result, the lower discharge space of box type is used as supplementary cell in a general plasma display panel.

Therefore, the DC type plasma display panel for back light according to another embodiment of the present invention has improved discharge efficiency and brightness compared with that of the above embodiment. This is because the positive column discharge generated in the center of discharge space has brightness higher the negative glow discharge generated around cathode electrode.

In detail, according to the discharge cell structure of general DC type plasma display panel, negative glow discharge is generally generated due to the short distance between cathode electrode and anode electrode, thereby lowering brightness. However, according to another embodiment of the present invention, negative glow discharge is firstly generated in the lower discharge space of box type and then, positive column discharge is generated in the upper discharge space, thereby obtaining high brightness. And, the present invention also has an advantage of high discharge efficiency since the lower discharge space is used as a supplementary cell.

As described above, according to the present invention, plasma display panel is employed as back light of liquid crystal display device, thereby being free form pollution by Hg. And, it is also useful to reduce the production cost since it is not required to perform printing, drying and firing processes in order to form cathode and anode electrodes. Moreover, high brightness can be obtained by the positive column discharge. Therefore, the present invention can be advantageously employed to realize high quality screen of liquid crystal display device.

Although the preferred embodiment of this invention has been disclosed for illustrative purpose, those skilled in the art will appreciate that various modifications, additions and substitutions are possible, without departing from the scope and spirit of the invention.

What is claimed is:

1. A DC type plasma display panel for back light of liquid crystal display device comprising:

a rear substrate functioning as a cathode electrode, having a first groove formed at the edge of the upper side and a first oxide layer formed to surround the edge of the upper side including the first groove and all over the down side thereof;

an anode electrode plate arranged over the rear substrate with a predetermined distance, having a second groove formed at the edge of the down side corresponding to the first groove of the rear substrate and a second oxide layer formed to surround the edge of the down side including the second groove and the edge of the upper side, having a plurality of holes therein;

a seal frame sealing the rear substrate and the anode electrode plate, wherein the down side of the seal frame is put in the first groove of the rear substrate and the upper side of the seal frame is put in the second groove of the anode electrode plate, and a third oxide layer is formed on the outer side of the seal frame;

a front substrate arranged over the anode electrode plate with a predetermined distance, having a fluorescent layer formed on the upper side thereof opposite to the anode electrode plate;

a plurality of spacers interposed between the anode electrode plate and the front substrate;

seal paste sealing the edges of the anode electrode plate and the front substrate; and discharge gas filled in the space between the rear substrate and the anode electrode plate and also in the space between the anode electrode plate and the front substrate.

2. The DC type plasma display panel for back light of liquid crystal display device according to claim 1, wherein the rear substrate is made of aluminum.

3. The DC type plasma display panel for back light of liquid crystal display device according to claim 1, wherein the anode electrode plate is made of aluminum.

4. The DC type plasma display panel for back light of liquid crystal display device according to claim 1, wherein the first oxide layer is formed in the first groove of the rear substance, and the second oxide layer is formed in the second groove of the anode electrode plate.

5. The DC type plasma display panel for back light of liquid crystal display device according to claim 1, wherein the holes are formed at the region of the anode electrode plate unformed the second oxide layer in the inner side of the seal frame.

6. The DC type plasma display panel for back light of liquid crystal display device according to claim 1, wherein the first oxide layer is formed on the rear substrate at least on and near the first groove, and the second oxide layers is are formed on the anode electrode plate at least on and near the second groove.

7. The DC type plasma display panel for back light of liquid crystal display device according to claim 1, wherein the holes are formed at the region adjacent to the second groove of the anode electrode plate formed the second oxide layer in the inner side of the seal frame.

8. The DC type plasma display panel for back light of liquid crystal display device according to claim 7, wherein the discharge space defined by the rear substrate, the anode electrode plate and the seal frame has a box shape.

9. The DC type plasma display panel for back light of liquid crystal display device according to claim 1, wherein the first groove of the rear substrate and the second groove of the anode electrode plate are formed to have the same width and depth.

10. The DC type plasma display panel for back light of liquid crystal display device according to claim 1, wherein the width of each of the seal frame and the third oxide layer is substantially same as the width of the first groove having the first oxide layer formed on the surface of the first groove, and further wherein the width of the seal frame and the third oxide layer is substantially same as the width of the second groove having the second oxide layer formed on the surface of the second groove.

* * * * *